(12) United States Patent
Philbrick et al.

(10) Patent No.: US 9,190,907 B2
(45) Date of Patent: Nov. 17, 2015

(54) SYSTEM AND METHOD OF EQUIVALENT SERIES INDUCTANCE CANCELLATION

(71) Applicant: INTERSIL AMERICAS LLC, Milpitas, CA (US)

(72) Inventors: Rhys S. A. Philbrick, San Jose, CA (US); Emil Chen, San Jose, CA (US); Gwilym Luff, Cambridge (GB); Ruchi J. Parikh, Mountain View, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 244 days.

(21) Appl. No.: 14/087,638

(22) Filed: Nov. 22, 2013

(65) Prior Publication Data
US 2015/0061632 A1    Mar. 5, 2015

Related U.S. Application Data

(60) Provisional application No. 61/871,597, filed on Aug. 29, 2013.

(51) Int. Cl.
 *H02M 3/156*  (2006.01)
 *H02M 3/158*  (2006.01)
 *H02M 1/00*   (2007.01)

(52) U.S. Cl.
 CPC ...... *H02M 3/158* (2013.01); *H02M 2001/0016* (2013.01); *H02M 2003/1566* (2013.01)

(58) Field of Classification Search
 CPC ........................................... H02M 3/156
 USPC .................................. 323/271, 282
 See application file for complete search history.

(56) References Cited

U.S. PATENT DOCUMENTS

| | | | | |
|---|---|---|---|---|
| 2005/0040799 A1* | 2/2005 | Pannwitz | ............... | G05F 1/575 323/282 |
| 2008/0174289 A1* | 7/2008 | Gurcan | ................... | G05F 1/575 323/280 |
| 2010/0164449 A1* | 7/2010 | Dwarakanath | ...... | H02M 3/1582 323/282 |
| 2010/0283437 A1* | 11/2010 | Chung | ................... | H02M 1/44 323/212 |
| 2011/0260703 A1* | 10/2011 | Laur | ................... | H02M 3/1563 323/271 |
| 2013/0093403 A1* | 4/2013 | Jia | ...................... | H02M 3/1588 323/272 |
| 2014/0042999 A1* | 2/2014 | Barth | ................... | H02M 5/293 323/271 |
| 2014/0139198 A1* | 5/2014 | Manlove | .................. | G05F 1/10 323/282 |
| 2015/0061632 A1* | 3/2015 | Philbrick | ............. | H02M 3/158 323/290 |

\* cited by examiner

*Primary Examiner* — Jeffrey Sterrett
(74) *Attorney, Agent, or Firm* — Gary Stanford

(57) ABSTRACT

An equivalent series inductance (ESL) cancel circuit for a regulator for adjusting a feedback voltage by attenuating a magnitude of a square wave ripple voltage developed on an output voltage. The regulator includes an output inductor and an output capacitor, in which the capacitor has an ESL which forms an inductive voltage divider with the output inductor causing the square wave voltage ripple. The ESL cancel circuit may include first and second current sources and a resistor device coupled between the output node and an adjust node which is further coupled to a feedback input of the regulator. The first current source applies a current proportional to the output voltage to the adjust node. The second current source selectively applies a current proportional to the input voltage of the regulator based on a state of the pulse control signal.

20 Claims, 4 Drawing Sheets

US 9,190,907 B2

SYSTEM AND METHOD OF EQUIVALENT SERIES INDUCTANCE CANCELLATION

CROSS-REFERENCE TO RELATED APPLICATIONS

This application claims the benefit of U.S. Provisional Application Ser. No. 61/871,597, filed on Aug. 29, 2013 which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Single phase and multiple phase (multiphase) regulators may be designed for single cycle response to load transients. The transient response can be tuned to be output filter limited. As the frequency of switching FSW is increases, and as the inductance of the output inductor L and the capacitance of the output capacitor are both reduced, there is a greater challenge to achieve single cycle response to load transients. In particular, equivalent series characteristics of the output capacitor, such as equivalent series inductance (ESL) and equivalent series resistance (ESR) of the output capacitor, causes a square wave voltage ripple on the output voltage which causes the transient response to increase to more than one cycle. The ESL of the output capacitor forms an inductor divider with the output physical output inductor, which causes a square wave to be superimposed on the output voltage due to switching of the phase node.

Conventional alternatives, such as increasing the output filter (i.e., increasing the size of the output capacitor) and/or providing a slower response to transient events result in disadvantages. A larger capacitor increases cost and makes it more difficult to incorporate onto an integrated circuit. A fast response is desired to maintain output voltage requirements or otherwise to meet output characteristic specifications.

Figure 1:
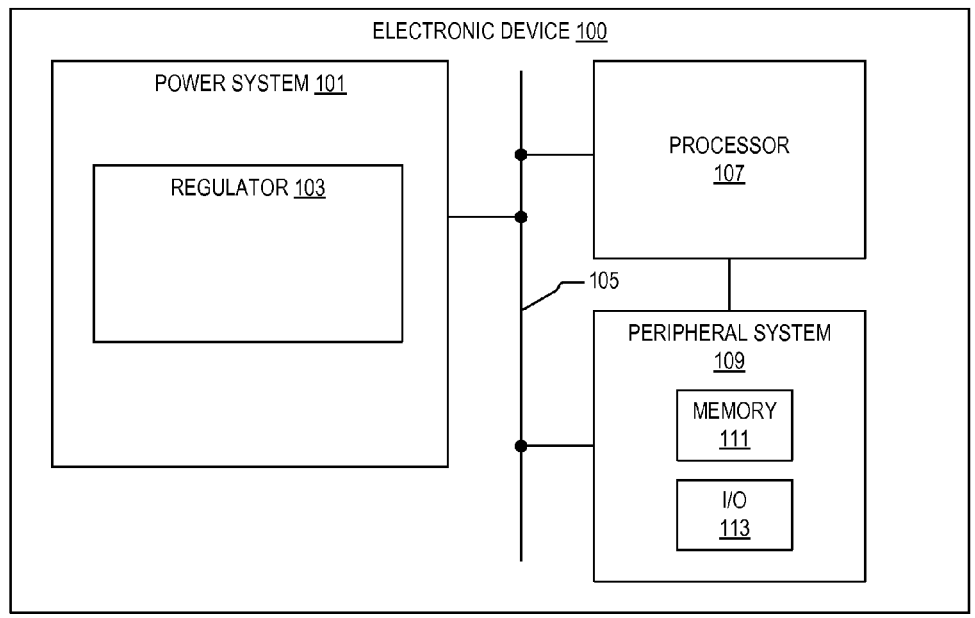
FIG. 1 is a simplified block diagram of a computer system configured with a power supply including a regulator implemented with ESL cancellation according to an embodiment of the present invention.

FIG. 1 is a simplified block diagram of a computer system 100 configured with a power supply 101 including a regulator 103 implemented with ESL cancellation according to an embodiment of the present invention. The power supply 101 develops one or more supply voltages which provide power to other system devices of the computer system 100 via a connection system 105. The connection system 105 may be a bus system or switch system or a set of conductors or the like. In the illustrated embodiment, the computer system 100 includes a processor 107 and a peripheral system 109 both coupled to the connection system 105 to receive supply voltages from the power supply 101. In the illustrated embodiment, the peripheral system 109 may include any combination of a system memory 111 (e.g., including any combination of RAM (random access) and ROM (read only) memory type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

Figure 2:
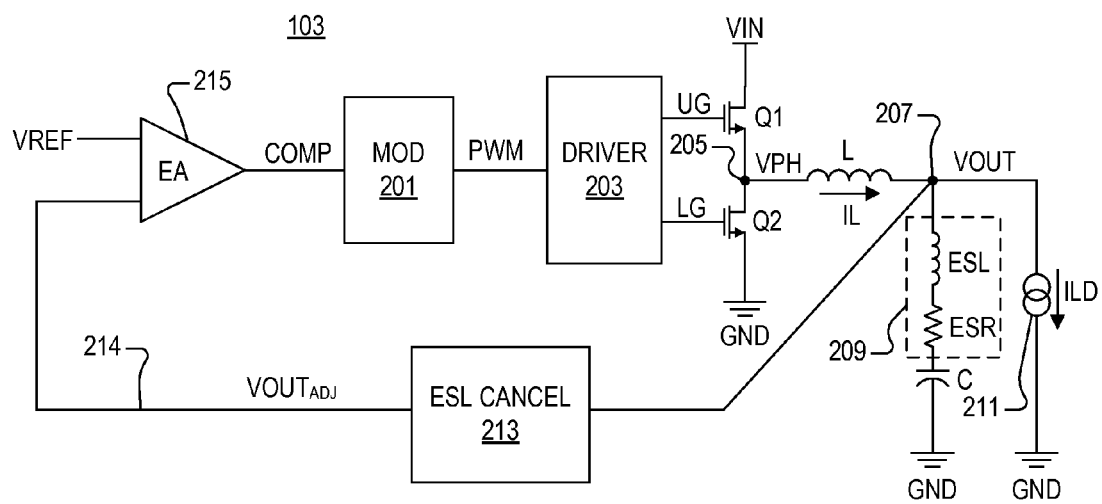
FIG. 2 is a simplified schematic and block diagram of the regulator of FIG. 1, which is shown as a buck-type DC-DC switch mode regulator implemented according to one embodiment.

FIG. 2 is a simplified schematic and block diagram of the regulator 103, which is shown as a buck-type DC-DC switch mode regulator implemented according to one embodiment. The regulator 103 includes a modulator 201 developing and providing a pulse-width modulation (PWM) signal to a driver 203. The driver 203 provides an upper gate drive signal UG to a gate terminal of an upper switch Q1 and provides a lower gate drive signal LG to a gate terminal of a lower switch Q2. In the illustrated embodiment, the electronic switches Q1 and Q2 are shown as FET or MOS type devices, such as a pair of N-channel metal-oxide semiconductor, field-effect transistors (MOSFETs) as known to those skilled in the art. Other types of electronic switching devices may be used including other types of FETs and the like, and other types of transistors, such as bipolar junction transistors (BJTs) or insulated-gate bipolar transistors (IGBTs) and the like, etc. The switch Q1 has drain and source terminals coupled between an input voltage VIN and a phase node 205 and the switch Q2 has drain and source terminals coupled between the phase node 205 and ground (GND). The phase node 205 develops a phase voltage VPH.

The phase node 205 is coupled to one end of an output inductor L, having its other end coupled to an output node 207 which develops an output voltage VOUT. An output capacitor C is coupled between the output node 207 and ground. An equivalent series circuit 209 is shown coupled between output node 207 and one end of the capacitor C. The equivalent series circuit 209 includes an equivalent series inductor ESL coupled in series with an equivalent series resistor ESR. ESL and ESR are not physical devices but instead represent series inductance and resistance of the physical capacitor C. The present disclosure primarily addresses the adverse effects of ESL. A load 211 is shown coupled between the output node 207 and GND and develops a load current ILD during operation.

VOUT is fed back to an input of an ESL cancel circuit 213, having an output providing an adjusted output voltage VOUT$_{ADJ}$ on an adjust node 214 to an input of an error amplifier (EA) 215. A reference voltage VREF is provided to another input of EA 215, which provides a compensation (COMP) voltage to an input of the modulator 201. In a conventional configuration, VOUT may be fed back directly or via a feedback circuit (not shown) may be included to feed back a proportional feedback signal indicative thereof. As an example, a feedback voltage divider (e.g., resistors coupled in series between output node 207 and ground forming an intermediate junction) may included for sensing VOUT provided as a feedback signal (e.g., provided via the intermediate junction of the feedback voltage divider).

In operation, the EA 215 amplifies a difference between VREF and VOUT$_{ADJ}$ and develops the COMP signal provided to the modulator 201. The modulator 201 receives COMP and adjusts the duty cycle of the PWM signal to control the voltage level of VOUT, in which PWM is provided to an input of the driver 203. The driver 203 alternatively turns on and off the switches Q1 and Q2 to switch one end of the output inductor L between VIN and GND to convert VIN to VOUT as controlled by PWM. In general, when PWM is at a first level, such as asserted high, the driver 203 turns Q2 off and turns Q1 on to couple VIN to the phase node 205 during a power portion of a cycle. When PWM switches state, such as when it goes low, the driver 203 turns Q1 off and then turns Q2 on to couple the phase node 205 to GND for at least a portion of the remainder of the cycle. Although not shown, a control circuit or the like in the driver 203 ensures that only one of the switches Q1 and Q2 is on at a time). Operation repeats in this manner for successive cycles of PWM.

The inductor L develops an inductor current IL to provide the load current ILD to the load 211 and to charge the output capacitor C. VOUT (or a proportional level thereof) is fed back to the EA 215 for closing the loop and developing PWM for controlling the output as understood by those of ordinary skill in the art.

Figure 3:
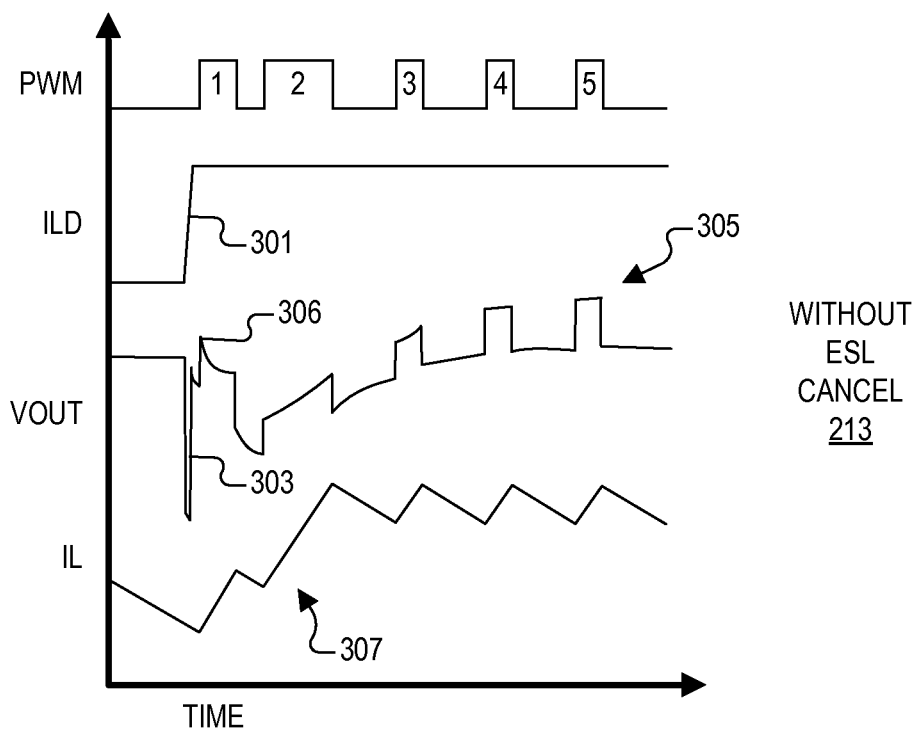
FIG. 3 is a timing diagram plotting the PWM signal, the load current ILD, the output voltage VOUT, and the inductor current IL versus time illustrating conventional response to a load transient at the output without operation of the ESL cancel circuit of FIG. 2.

FIG. 3 is a timing diagram plotting the PWM signal, the load current ILD, the output voltage VOUT, and the inductor current IL versus time illustrating exemplary response to a load transient at the output without operation of the ESL cancel circuit 213. In other words, operation is shown as though the ESL cancel circuit 213 were removed or otherwise inoperative so that VOUT is sensed without adjustment. The PWM cycles are shown numbered after the load transient (cycles 1-5). The load current ILD is initially low and relatively steady, and then jumps high as shown at 301 in response to a sudden increase in demand of the load 211. VOUT experiences an output voltage transient 303 in which it pulses low and then back high. Then VOUT decreases to a lower level and then is eventually pulled back to its normal operating level due to operation of the regulator 103 without the ESL circuit 213.

During operation, a square wave shown at 305 is superimposed on VOUT as a result of the ESL of the output capacitor C. The regulator 103 responds relatively quickly to the load transient as desired within the first PWM pulse in cycle 1. Without the ESL cancel circuit 213, however, the square wave 305 that is superimposed on VOUT is also fed back to the error amplifier 215 and modulator 201. This combined signal results in a high peak shown at 306 on VOUT that is fed back to the regulator 103. The regulator 103 detects the high pulse 306 causing it to respond quickly again and terminate the PWM pulse prematurely.

When PWM goes back low, VOUT drops accordingly causing the regulator 103 to generate another pulse on the PWM signal beginning the second PWM cycle 2. The inductor current IL toggles between ramping low and ramping high during switching operation of PWM, but does not recover in response to the load transient in a single cycle of PWM. As shown, the inductor current IL experiences an additional switching cycle shown at 307, and does not recover until cycle 2 of PWM.

It is generally desired to have a higher switching frequency (FSW) of PWM while having a reduced size output inductor L and output capacitor C. The increase of the switching frequency combined with the reduction of the sizes of the output filter (LC) hampers single cycle response as shown in FIG. 3. The ESL of the output capacitor C forms an inductor divider with the output inductor L, which is responsive to the voltage switching of the phase node 205 resulting in the square wave shown at 305 superimposed on VOUT coincident with switching cycles. The magnitude of the superimposed square wave hampers switching by artificially terminating the initial PWM pulse, thus increasing the overall response time of the regulator 103 to load transients.

Figure 4:
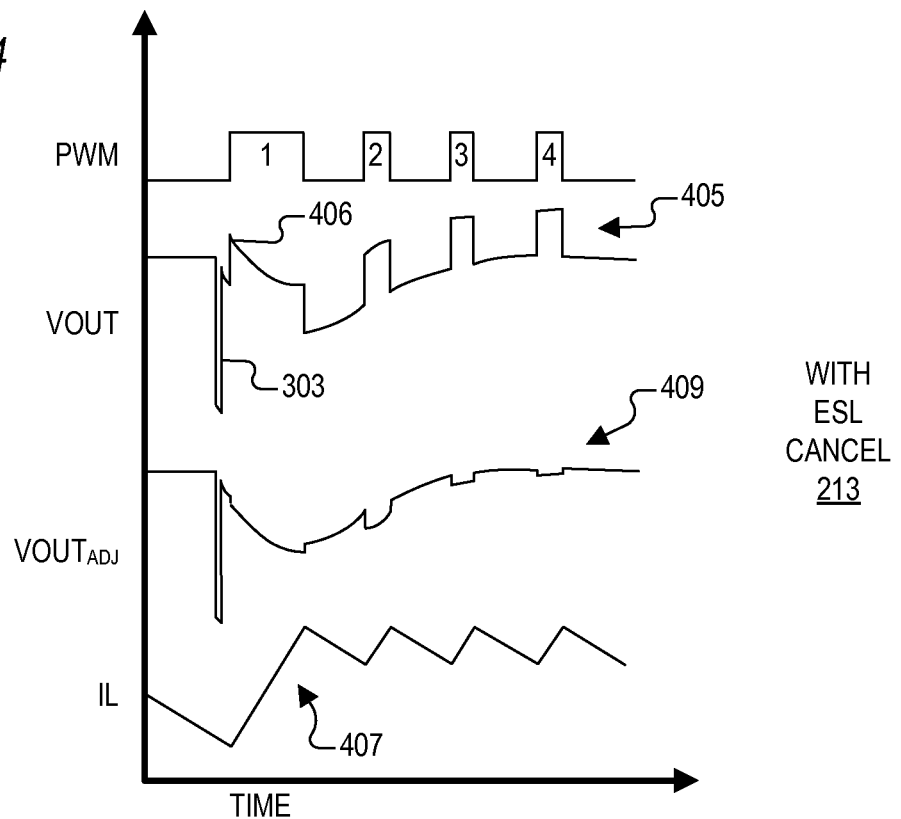
FIG. 4 is a timing diagram plotting the PWM signal, the output voltage VOUT, the adjusted output voltage $VOUT_{ADJ}$ and the inductor current IL in response to a load transient at the output including operation of the ESL cancel circuit of FIG. 2.

FIG. 4 is a timing diagram plotting the PWM signal, the output voltage VOUT, the adjusted output voltage VOUT$_{ADJ}$ and the inductor current IL in response to a load transient at the output including operation of the ESL cancel circuit 213. The PWM cycles are again shown numbered after the load transient (cycles 1-4). In this case, the ESL cancel circuit 213 adjusts VOUT to provide VOUT$_{ADJ}$ to substantially cancel the square wave voltage ripple caused by the inductor voltage divider between the output inductor and ESL and to enable single cycle response. As shown, the ESL cancel circuit 213 is operative to substantially attenuate the magnitude of the square wave on the feedback version of VOUT, or VOUT$_{ADJ}$, as shown at 409.

During operation, a square wave shown at 403, similar to the square wave 305, may still be superimposed on VOUT as a result of the ESL of the output capacitor C. The regulator 103 again responds relatively quickly to the load transient as desired within the first PWM pulse in cycle 1, so that the square wave 405 develops a high peak 406 similar to the peak 306. In this case, however, the ESL cancel circuit 213 substantially cancels the superimposed square wave 405 with the peak 406 from appearing on the feedback signal VOUT$_{ADJ}$, and VOUT$_{ADJ}$ is fed back rather than VOUT. In this manner, the initial PWM pulse in the first cycle 1 is not prematurely terminated. Thus, the inductor current IL continues to ramp up in a single cycle of PWM as shown at 407 in response to the load transient and thus is responsive within the first switching cycle, shown as PWM cycle 1. In this case, the inductor current IL does recover in response to the load transient in a single cycle of PWM.

Figure 5:
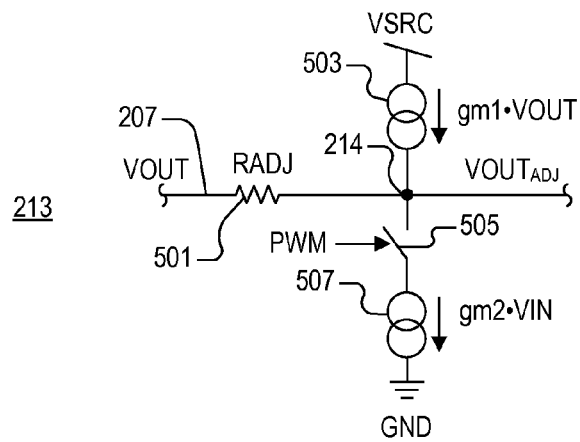
FIG. 5 is a schematic diagram of the ESL cancel circuit of FIG. 2 implemented according to one embodiment of the present invention.

FIG. 5 is a schematic diagram of the ESL cancel circuit 213 according to one embodiment of the present invention. Node 207 developing VOUT is coupled to one end of a resistor device 501, having its other end coupled to the node 214 developing VOUT$_{ADJ}$. A current source 503 is coupled between a voltage source providing a source voltage VSRC and node 214 and provides a current gm1·VOUT to node 214. One switched terminal of a single-pole, single-throw (SPST) switch 505 is coupled to node 214, and the other switched terminal is coupled to one terminal of another current source 507. The switch 505 may be implemented in any suitable manner, such as including a transistor device or the like. The other terminal of the current source 507 is coupled to GND and it sources a current gm2·VIN through the switch 505 (when closed) to GND. The switch 505 has a control terminal receiving the PWM signal.

The resistor device 501 is shown having a resistance RADJ indicating that it can be adjustable. In one embodiment, for a given implementation, the value of the resistance RADJ is selected based on gain values to provide the desired level of attenuation of the square wave superimposed on VOUT. Once selected and adjusted accordingly, the resistance of the resistor device 501 is not changed and instead has a static resistor value. In another embodiment, an adjustable resistor is used and is adjusted for a given implementation. Once adjusted, its resistance value remains unmodified during operation.

In one embodiment, PWM goes high during the power portion during which time the driver 203 turns on Q1 to couple the phase node 205 to the output inductor L. In this case, when PWM goes high it also closes the switch 505, and when PWM goes low it opens the switch 505. The value gm1 is a first transconductance gain and gm2 is a second transconductance gain. Thus, the current source 503 develops a current proportional to the output voltage VOUT multiplied by the transconductance gain gm1, and the current source 507 develops a current proportional to the input voltage VIN multiplied by the transconductance gain gm2. In one embodiment, gm1=gm2=gm in which the gains are the same. Alternatively, the transconductance gains gm1 and gm2 may be different or otherwise adjusted to achieve the desired results of reducing the magnitude of the square wave superimposed on VOUT.

In operation, the current source 503 continuously provides the current gm1·VOUT proportional to the output voltage VOUT to the node 214, while the current source 507 draws or sinks the current gm2·VIN from the node 214 only when the switch 505 is closed. With reference to FIG. 4, just after the voltage transient 303 in response to the load transient, PWM goes high so that the inductor current IL increases while the upper switch Q1 is turned on. VOUT jumps high when switch Q1 is turned on since the phase voltage VPH increases to VIN. The inductor divider between output inductor L and ESL causes a corresponding increase of VOUT.

When PWM goes high, however, it also closes the switch 505 so that the additional current gm2·VIN is pulled from node 214 for a combined current of gm1·VOUT−gm2·VIN applied to node 214. The combined current increases or decreases the current through the resistor device 501 thus increasing or reducing $VOUT_{ADJ}$ relative to VOUT. Assuming gm1=gm2 and a buck configuration in which VIN>VOUT, the combined current gm1·VOUT−gm2·VIN pulls current from node 214 so that $VOUT_{ADJ}$ decreases relative to VOUT as shown in FIG. 4. The square wave that was added to VOUT is attenuated on $VOUT_{ADJ}$. When PWM goes back low, Q1 is turned off and Q2 is turned on, so that IL ramps down and the switch 505 is opened. The current gm2·VIN is removed and only the current gm1·VOUT is added, which increases the voltage of $VOUT_{ADJ}$ relative to VOUT. Thus, the high level of the square wave is reduced and the low level of the square wave is increased.

As shown at 405, the square wave of VOUT is substantially attenuated on $VOUT_{ADJ}$. Since $VOUT_{ADJ}$ is a smoothed version of VOUT, the response of the regulator 103 to the load transient responds to the transient event quickly, such as within a single PWM cycle. The inductor current IL continues to toggle between ramping up and down, but at a higher current level in response to the increased load level as shown in FIG. 4.

Figure 6:
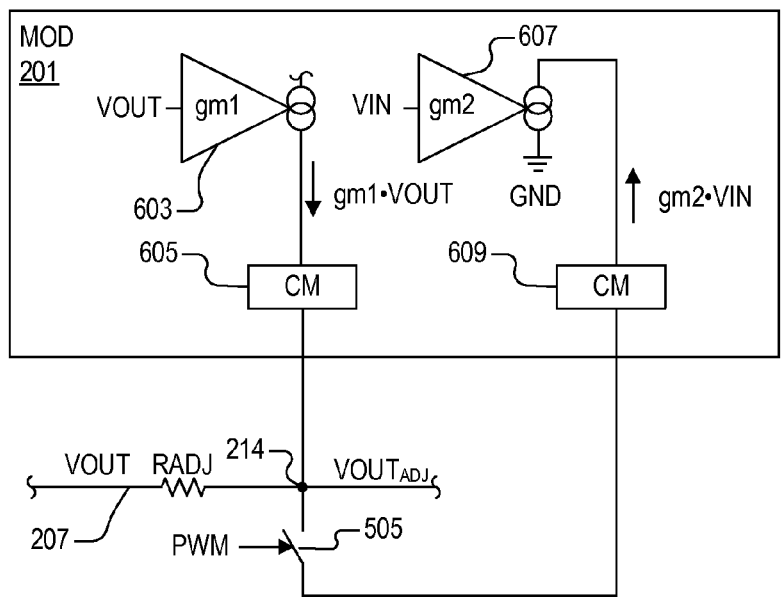
FIG. 6 is a simplified schematic and block diagram of an alternative embodiment of the present invention for providing the correction currents to adjust $VOUT_{ADJ}$ relative to VOUT on the adjust node of FIG. 2.

FIG. 6 is a simplified schematic and block diagram of an alternative embodiment for providing the correction currents to adjust $VOUT_{ADJ}$ relative to VOUT on node 214. The current sources 503 and 507 may each be implemented by a transconductance amplifier having an input receiving the requisite voltage, either VIN or VOUT. In certain configurations, the modulator 201 already includes a first transconductance amplifier 603 receiving VOUT and providing a current gm1·VOUT and a second transconductance amplifier 607 receiving VIN and providing a current gm2·VIN. Rather than regenerating these currents using separate current sources or amplifiers or the like, a first current mirror (CM) 605 is provided to mirror gm1·VOUT into node 214 and a second current mirror 609 is provided to mirror gm2·VIN from node 214 via the switch 507.

Figure 7:
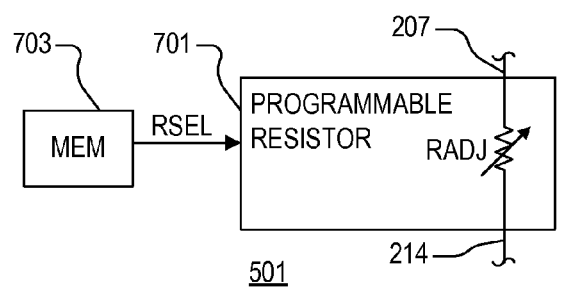
FIG. 7 is a block diagram depicting one embodiment of the resistor of FIG. 5 implemented as an adjustable or programmable resistor programmed by a memory.

FIG. 7 is a block diagram depicting one embodiment of the resistor device 501 implemented as an adjustable or programmable resistor and programmed by a memory. In this case, the resistance value of RADJ is selected as part of a programmable resistor 701 having a programmable value based on a select input. The programmable resistor 701 may be implemented in an analog or digital manner. The value of RADJ is determined to maximize the level of square wave attenuation for a particular implementation. It is noted that gm1 and/or gm2 (or single gain gm) may also be adjusted to achieve the desired attenuation. Once RADJ is determined, a value RSEL is provided to or otherwise maintained at the select input of the programmable resistor 701. A programmable memory (MEM) 703 or the like may be used to provide the RSEL value. The MEM 703 may be implemented as a RAM or ROM or the like. In an alternative embodiment, the MEM 703 may be implemented as or replaced by one or more programmable fuses for providing or otherwise adjusting RSEL to achieve the desired value of RADJ.

Figure 8:
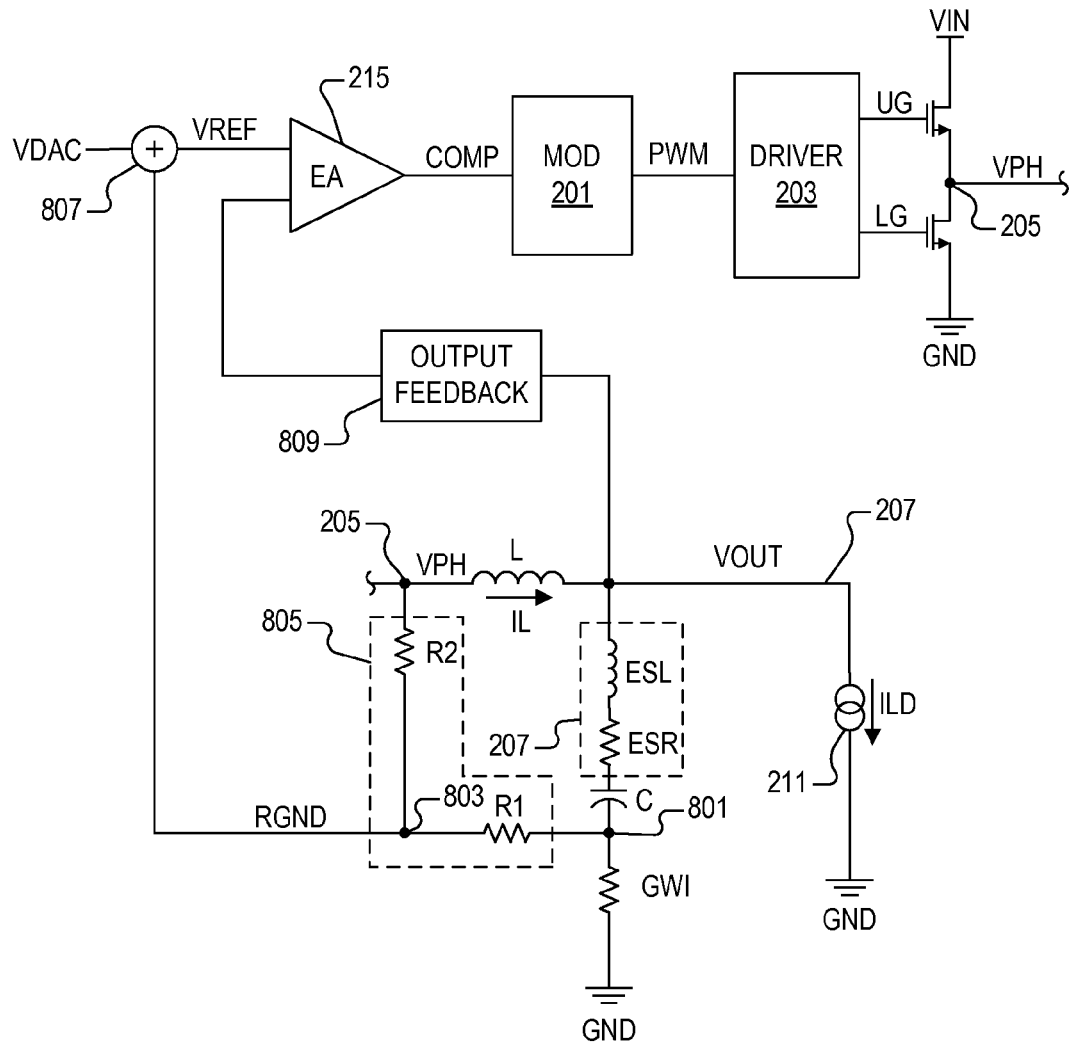
FIG. 8 is a simplified schematic and block diagram illustrating an alternative embodiment of an ESL cancel circuit provided between the output portion and a feedback input of the regulator of FIG. 2.

FIG. 8 is a simplified schematic and block diagram illustrating an alternative embodiment of an ESL cancel circuit provided between the output portion and a feedback input of the regulator 103. The regulator 103 includes similar portions as previously described, except that the ESL cancel circuit 213 is replaced by an output feedback circuit 809 coupled between the output node 207 and a feedback input of the error amplifier 215. In this case, a different ESL cancel circuit 805 is inserted between the phase node 205 and an RGND connection, which is fed back to adjust the reference input of the error amplifier 215. Operation is similar except that cancelation occurs at the other polarity of the feedback sense voltage.

In some configurations the regulator 103 includes a remote ground sense or "Kelvin" ground connection 801. A resistor ground (RGND) connection is made at the grounded end of the output capacitor C at 801. A resistor GWI is shown coupled between 801 and GND representing the impedance of ground wiring. The RGND connection is routed to one input of an adder 807, which receives a voltage VDAC at another input and which provides the reference voltage VREF previously described at its output. VDAC is programmed to provide a voltage level that is a target level of VREF. The RGND connection provides a more accurate ground reference relative to the output capacitor. This remote ground connection makes up for losses in the low side connection to the load and has an inverting function. If RGND goes higher, it has the same feedback effect as though VOUT went lower.

The ESL cancel circuit 805 includes two resistors R1 and R2. R1 is inserted between node 801 and a node 803, in which RGND is routed to the adder 805 from node 803. R2 is coupled between the phase node 205 and node 803. This method has a similar effect as the ESL cancel circuit 213, with a small DC offset. In this case, voltage is only subtracted when VPH (the phase node 205) is high. When VPH is low, it is almost the same voltage as remote ground and thus has little effect. The peak-to-peak voltage can be made the same and the first method for the purpose of canceling the inductor divider square wave superimposed on VOUT. Also, additional adjustments may be made for DC accuracy.

An ESL cancellation system and method as described herein enables smaller output filters and improved (faster) load transient performance. This enables the ability to run a processor faster and more efficiently.

The benefits, features, and advantages of the present invention have become better understood with regard to the foregoing description and accompanying drawings. The description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An equivalent series inductance cancel circuit for a regulator including an output inductor coupled to an output capacitor at an output node in which the output capacitor has an equivalent series inductance, wherein the regulator transitions a pulse control signal between inactive and active states for controlling conversion of an input voltage to an output voltage developed on the output node, and wherein said equivalent series inductance cancel circuit comprises:
    a resistor device for coupling between the output node and an adjust node, wherein said adjust node is further coupled to an output voltage feedback input of the regulator;
    a first current source that develops a first current proportional to the output voltage of the regulator, wherein said first current is provided to said adjust node;
    a second current source that develops a second current proportional to the input voltage of the regulator; and
    a switch, responsive to the pulse control signal, that couples said second current source to said adjust node to sink said second current from said adjust node when said pulse control signal is in the active state, and that disconnects said second current source from said adjust node when said pulse control signal is in the inactive state.

2. The equivalent series inductance cancel circuit of claim 1, wherein said first current source comprises a first transconductance amplifier and wherein said second current source comprises a second transconductance amplifier.

3. The equivalent series inductance cancel circuit of claim 2, wherein a gain of at least one of said first and second transconductor amplifiers is adjusted to attenuate a magnitude of a square wave superimposed on the output node caused by the equivalent series inductance of the output capacitor.

4. The equivalent series inductance cancel circuit of claim 2, further comprising:
    a first current mirror coupled to said first transconductance amplifier that mirrors said first current to said adjust node; and
    a second current mirror coupled to said second transconductance amplifier that mirrors said second current to said adjust node via said switch.

5. The equivalent series inductance cancel circuit of claim 1, wherein gains of said first and second current sources are adjusted to attenuate a magnitude of a square wave voltage ripple superimposed on the output node caused by the equivalent series inductance of the output capacitor.

6. The equivalent series inductance cancel circuit of claim 1, wherein said resistor device comprises an adjustable resistor.

7. The equivalent series inductance cancel circuit of claim 1, wherein said resistor device has a resistance that is selected to attenuate a square wave voltage ripple superimposed on the output node caused by the equivalent series inductance of the output capacitor.

8. The equivalent series inductance cancel circuit of claim 1, wherein said resistor device comprises a programmable resistor that is programmed by a memory device.

9. An electronic device, comprising:
    a regulator, comprising:
        an output inductor coupled to an output node;
        a switching circuit coupled to said output inductor and responsive to a pulse control signal to convert an input voltage to an output voltage on said output node;
        an output capacitor coupled to said output inductor at said output node, wherein said output capacitor has an equivalent series inductance that forms an inductor divider which develops a square wave voltage ripple superimposed on said output voltage;
        an adjust node receiving an adjusted feedback voltage;
        an feedback control circuit having an input coupled to said adjust node and having an output providing said pulse control signal; and
        an equivalent series inductance cancel circuit coupled between said output capacitor and said adjust node that attenuates a magnitude of said square wave voltage ripple provided to said input of said feedback control circuit.

10. The electronic device of claim 9, further comprising a processor and a memory coupled to said regulator.

11. The electronic device of claim 9, wherein said equivalent series inductance cancel circuit comprises:
    a resistor device coupled between said output node and said adjust node;
    a first current source that develops a first current proportional to said output voltage of said regulator, wherein said first current is provided to said adjust node;
    a second current source that develops a second current proportional to said input voltage of said regulator; and
    a switch, responsive to said pulse control signal, that couples said second current source to said adjust node to sink said second current from said adjust node when said pulse control signal is in an active state, and that disconnects said second current source from said adjust node when said pulse control signal is in an inactive state.

12. The electronic device of claim 11, wherein said first current source comprises a first transconductance amplifier and wherein said second current source comprises a second transconductance amplifier.

13. The electronic device of claim 12, further comprising:
a first current mirror coupled to said first transconductance amplifier that mirrors said first current to said adjust node; and
a second current mirror coupled to said second transconductance amplifier that mirrors said second current to said adjust node via said switch.

14. The electronic device of claim 11, wherein a gain of at least one of said first and second current sources is adjusted to attenuate a magnitude of said square wave voltage ripple.

15. The electronic device of claim 11, wherein said resistor device comprises an adjustable resistor.

16. The electronic device of claim 11, wherein said resistor device has a resistance that is selected to attenuate a magnitude of said square wave voltage ripple.

17. The electronic device of claim 9, wherein:
said switching circuit is coupled to said output inductor at a phase node;
wherein said output capacitor is coupled at a Kelvin ground connection;
wherein said feedback control circuit comprises an error amplifier; and
wherein said equivalent series inductance cancel circuit comprises:
a first resistor coupled between said Kelvin ground connection and said adjust node;
a second resistor coupled between said phase node and said adjust node; and
an adder having a first input receiving a reference voltage, a second input coupled to said adjust node, and an output providing an adjusted reference voltage to a first input of said error amplifier, wherein said error amplifier has a second input receiving a feedback voltage indicative of said output voltage.

18. A method capable of canceling an equivalent series inductance of an output capacitor of a regulator that includes an output inductor coupled to an output capacitor at an output node, wherein the regulator transitions a pulse control signal between inactive and active states for controlling conversion of an input voltage to an output voltage developed on the output node, said method comprising:
coupling a resistor device between the output node and an adjust node which is coupled to an output voltage feedback input of the regulator;
providing a first current proportional to the output voltage of the regulator to the adjust node;
developing a second current proportional to the input voltage of the regulator; and
applying the second current to sink current from the adjust node while the pulse control signal is in the active state, and otherwise isolating the second current from the adjust node when the pulse control signal is in the inactive state.

19. The method of claim 18, further comprising selecting a resistance of the resistor device to attenuate a magnitude of a square wave voltage ripple developed on the output node caused by an inductive voltage divider between the output inductor and the equivalent series inductance of the output capacitor.

20. The method of claim 18, further comprising selecting a magnitude of each of the first and second currents to attenuate a magnitude of a square wave voltage ripple developed on the output node caused by an inductive voltage divider between the output inductor and the equivalent series inductance of the output capacitor.

* * * * *